O. S. THOMPSON.
METHOD AND MEANS FOR CORRECTING TEST PAPERS.
APPLICATION FILED APR. 23, 1917.
1,252,199.
Patented Jan. 1, 1918.
2 SHEETS—SHEET 1.
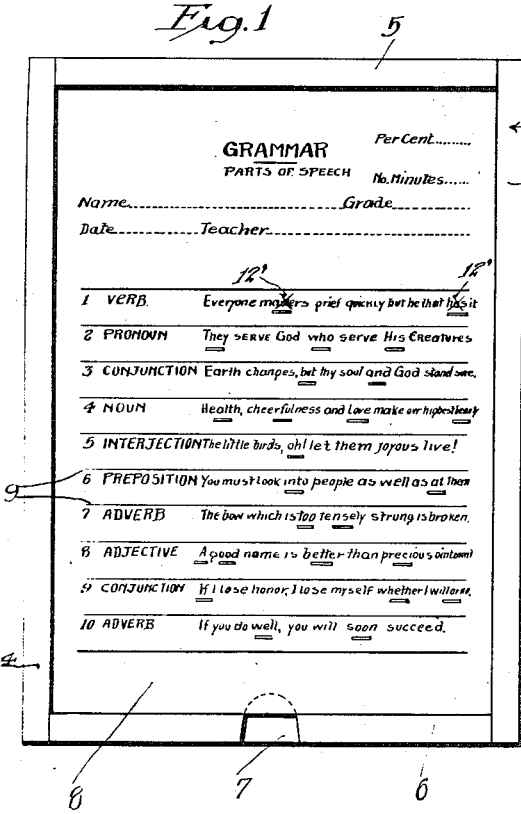
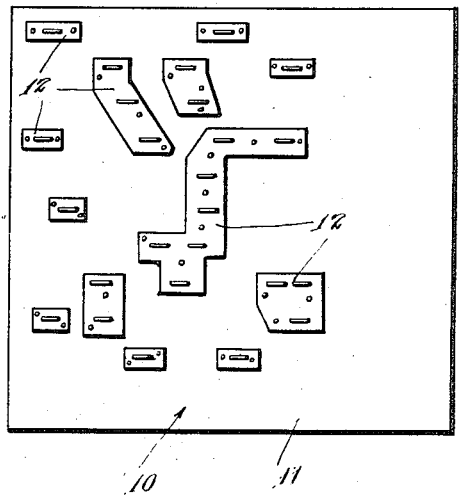
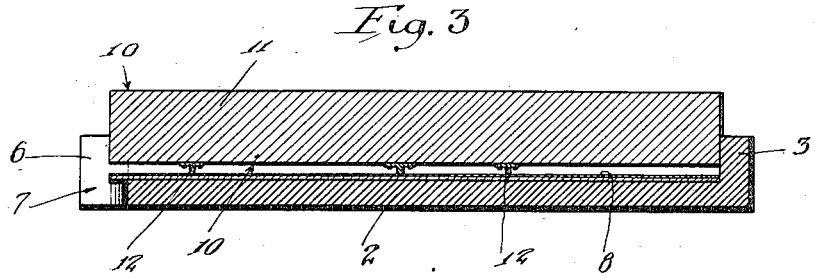
Witnesses:
Inventor
Oliver S. Thompson
By
Frederick P. Ryon
Atty O. S. THOMPSON.
METHOD AND MEANS FOR CORRECTING TEST PAPERS.
APPLICATION FILED APR. 23, 1917.

1,252,199.

Patented Jan. 1, 1918.
2 SHEETS—SHEET 2.

UNITED STATES PATENT OFFICE.

OLIVER S. THOMPSON, OF COMPTON, CALIFORNIA.

METHOD OF AND MEANS FOR CORRECTING TEST-PAPERS.

1,252,199.  Specification of Letters Patent.  Patented Jan. 1, 1918.

Application filed April 23, 1917. Serial No. 163,783.

*To all whom it may concern:*

Be it known that I, OLIVER S. THOMPSON, a citizen of the United States, residing at Compton, in the county of Los Angeles and State of California, have invented a new and useful Method of and Means for Correcting Test-Papers, of which the following is a specification.

This invention relates to a method of and means for correcting test papers of the type which have marks made thereon by the pupil, at certain characters appearing on the test papers which are indicated by the pupil as the answers to the questions of the test, and consists in the provision of means for causing marks to appear relative to characters of the test which represent the correct answers to the questions, in order that test papers may be quickly and accurately corrected.

An object of the invention is to provide a means of the above character for stamping upon a test sheet having a pupil's marks thereon indicating the answers to the test, marks distinctive from the pupil's marks and which are located near to and indicate the characters of the test which represent the correct answers to the questions thereof.

The accompanying drawings illustrate the invention:

Figure 1 is a top plan view of a test paper holder showing a test paper therein and bearing both the marks of the pupil and those made by the correction stamp;

Fig. 2 is a bottom plan view of the test stamp showing the dies thereon for making the correction marks on the test papers;

Fig. 3 is a transverse sectional view taken through the holder showing the test papers and test stamp therein;

Fig. 4 is a top plan view of a modified form of the invention;

Fig. 5 is a top plan view of a modified form of the correction device; and

Fig. 6 is a fragmentary plan view showing a modified form of the correction device in Fig. 5 as it would appear when in use.

Referring to the drawings, 1 designates a test paper holder which is in this instance of rectangular outline and comprises a base board 2, upstanding side flanges 3 and 4 and end flanges 5 and 6 abutting the side flanges. The end flange 6 is cut away as at 7 to enable the fingers to be inserted to facilitate the positioning and removal of test sheets.

The test sheets 8 are to be laid upon the base board 2, are of such dimensions that the side edges and one end edge thereof engage the side and one end flange of said base board and thus are held against shifting when within the holder. The test papers may be of various forms and as illustrated in the drawings comprise a test relating to "grammar" and parts of speech. Each paper contains spaced horizontal lines 9 between which are printed questions of the test, in this connection said questions being sentences containing verbs, pronouns, conjunctions, nouns, etc., each line containing different parts of speech appearing in the sentences, for example, in the first sentence the verbs are to be marked, in the second sentence the pronouns, and so on. The pupil's answer to the test is indicated by his making a mark through or adjacent to the verb, pronoun or other part of speech to be identified in the respective sentences. While the test papers illustrated and described are in this instance relative to grammar, it is to be understood that other tests referring to arithmetic and other subjects of study may be used.

In order to quickly determine whether the pupil has marked the test correctly, I provide a means for simultaneously causing marks to appear relative to words or characters of the test which represent the correct answers thereof, and this means preferably comprises a correction stamp 10 formed in the nature of a rectilinear block 11 whose width is equal to the space between the side flanges 3 and 4 of the holder 1 and whose length is governed by the number of lines of or the character of the test paper. It is required, however, that three sides of the block 11 engage with the side flanges and of one end flange of the holder so that the marking of the test paper will be accurate at all times. Upon the under face of the block 11 are secured dies 12 which may be of any suitable shape, and in this instance provide dash marks.

In order to provide for the making of a mark distinctive from that made by the pupil, such pupil's marks being ordinarily made by a pen or pencil, there is used a red or other distinctively colored inking pad, not shown, upon which the stamp 10 is placed prior to the stamping operation. It is to be understood that if desired, different forms of dies for making the correction marks may be employed, it being essential, however, that the marks made be distinctive from those of the pupil in color or shape.

In correcting the test papers, the papers may be placed singly or all together within the holder 1, the latter being preferable. The teacher or person correcting the papers then places the stamp 10, after having properly inked the dies 12, within the holder 1 so that the side of the stamp next to the operator engages the flange 6 of the holder and as the width of the block 11 is in correspondence to the space between the flanges 3 and 4, said stamp will readily assume the proper position, and when pressure is brought to bear thereon marks 12 will be caused to appear adjacent to the characters of the test which indicate the correct answers to the questions, that is, for example, in the first sentence of the test illustrated in the drawings the verbs "masters" and "has" are marked and if the pupil's marks 12' correspond to the marks made by the correction stamp the pupil has correctly marked the verbs in this sentence. It will be readily seen that the marks 12 made by the correction device in being distinctive from those made by the pupil will enable the person correcting the papers to readily determine errors made by the pupil and also that a permanent record of the correction is had.

In Fig. 4, there is illustrated a test paper 13 which has been stamped with a modified form of correction stamp not shown. In this form the dies of the stamp are so arranged as to cause all of the words or characters of the test except those which represent the correct answers to the questions of the test to be stamped with marks or a mark 14 so that the test paper may be quickly corrected. As shown the test paper 13 bears marks 14 made by the stamp and marks 15 made by the pupil and as only the characters not having the marks 14 thereon indicate the correct answers it is possible to quickly and accurately determine whether or not the paper is marked correctly by the pupil or to what extent incorrectly marked. Since the means employed in this form of the invention is identical with the means in the preferred form save for the die arrangement and the correction stamp, no further illustration than Fig. 4 is thought necessary.

Referring to Figs. 5 and 6 wherein I have illustrated a modified form of the invention, 16 designates a test paper holder of the same construction as the holder in the preferred form of the invention, comprising a base board 17, side flanges 18 and end flanges 19. This holder is adapted to contain test papers 20 and, as shown in Figs. 4 and 6, the test papers relate to grammar and parts of speech as do the test papers in the preferred form of the invention. It is to be understood, however, that these test papers may be related to other subjects of study as desired. As shown, sentences appear transversely on the papers and the pupil marks with a pen or pencil as at 21 the parts of speech in the different sentences, for example, the verbs in one sentence, the nouns in another, and so on.

I employ means to cause marks to appear adjacent to the words or characters which represent the correct answers to the test and said means comprises a correction sheet 22 of stiff card board or other like material. This sheet is adapted to be placed in the holder 16 upon the test sheets therein and is of such dimensions that its side edges and one end edge engage the side flanges and one end flange of the holder so as to be properly held in place. Elongated openings or slots 23 are formed transversely in the sheet and are adapted to register with and reveal the sentences or questions of the test, also the pupil's marks 21 which are made beneath or through the words selected by the pupil as answers to the questions. Marks 24 are located on the sheet along the edges of the slots 23 and are adapted to indicate the words or characters which represent the correct answers, such indication being provided when the correction sheet is placed within the holder upon a test sheet. It will be seen that when this is done the person correcting the test sheets may readily determine whether the pupil has marked the sheets correctly or not. The marks on the correction sheet may be distinct from those which are made by the pupil either as to color or design, or both.

I claim:

1. Means for simultaneously making marks on a test paper at points adjacent to and for the purpose of indicating certain characters which represent the correct answers of a test.

2. In means for correcting test papers, a holder for test papers and a stamp for making marks on a test paper while in the holder at points adjacent to and for the purpose of indicating the characters of the test which represent the correct answers.

3. In means for correcting test papers, a holder for test papers, and a correction stamp adapted to fit within the holder for stamping marks upon a test paper at points adjacent to and for the purpose of indicating certain characters of the test which represent the correct answers.

4. Means for simultaneously causing marks to appear adjacent to the characters of a test paper which represent the correct answers to the questions of the test so as to indicate which characters represent the correct answers.

5. In means for correcting test papers, a holder adapted to contain a test paper and a correction sheet adapted to be placed within the holder upon the test paper, said sheet having openings extending transversely thereof which are adapted to aline with and reveal the questions appearing on the test paper and being provided with marks adjacent to the edges of the openings, said marks adapted to appear adjacent to the characters of the test which represent the correct answers to the questions thereof.

6. Means for simultaneously making marks on a test paper at different points adjacent to and for the purpose of indicating certain characters which represent the correct answers of a test.

7. Means for simultaneously causing marks to appear adjacent to the different characters of a test paper which represent the correct answers to the questions of the test so as to indicate which characters represent the correct answers.

8. A means for correcting test papers comprising a correction sheet adapted to be placed over and upon a test paper, said sheet having openings therein alining with and revealing the questions of the test and being provided with marks alongside the openings which are adapted to appear adjacent to and indicate certain characters of the test which represent the correct answers to the questions thereof.

Signed at Los Angeles, California, this 3d day of April, 1917.

OLIVER S. THOMPSON.

Witnesses:
 CHAS. J. CHUNN,
 L. BELLE WEAVER.